US010305915B2

United States Patent
Valdetaro

(10) Patent No.: US 10,305,915 B2
(45) Date of Patent: *May 28, 2019

(54) PEER-TO-PEER SOCIAL NETWORK

(71) Applicant: Vertical Computer Systems, Inc., Richardson, TX (US)

(72) Inventor: Luiz Claudio Valdetaro, Coppell, TX (US)

(73) Assignee: Vertical Computer Systems Inc., Richardson, TX (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/951,252

(22) Filed: Jul. 25, 2013

(65) Prior Publication Data

US 2014/0164517 A1    Jun. 12, 2014

Related U.S. Application Data

(63) Continuation-in-part of application No. 13/491,372, filed on Jun. 7, 2012, and a continuation-in-part of
(Continued)

(51) Int. Cl.
*H04L 29/06* (2006.01)
*H04W 4/08* (2009.01)
(Continued)

(52) U.S. Cl.
CPC ......... *H04L 63/104* (2013.01); *H04L 63/029* (2013.01); *H04L 63/0281* (2013.01);
(Continued)

(58) Field of Classification Search
CPC ............... H04L 67/1044; H04L 63/104; H04L 63/0281; H04L 63/029; H04W 12/08; H04W 4/08; H04W 4/206
(Continued)

(56) References Cited

U.S. PATENT DOCUMENTS 6,647,001 B1    11/2003  Bhagavath
6,766,349 B1    7/2004   Belkin
(Continued)

FOREIGN PATENT DOCUMENTS

WO    2002067540 A1    8/2002
WO    2012082780 A1    6/2012

OTHER PUBLICATIONS

Henderson, Thomas R., "Host Mobility for IP Networks: A Comparison", IEEE Network, Nov./Dec. 2003, pp. 18-26, vol. 17, No. 6, IEEE Service Center, New York, NY, US.
(Continued)

*Primary Examiner* — William G Trost, IV
*Assistant Examiner* — Ronak Patel
(74) *Attorney, Agent, or Firm* — Jack D. Stone, Jr.; Scheef & Stone, L.L.P.

(57) ABSTRACT

A social network includes a relay server and two or more mobile Internet devices ("MIDs") coupled to the relay server. Each of the MIDs includes a relay agent for interfacing with the relay server, a web server, an application for operating the web server, and a memory for storing social networking information comprising a contacts list, one or more access groups, one or more albums, and one or more associations between the one or more access groups and the one or more albums to specify which contacts can view which albums.

16 Claims, 7 Drawing Sheets

Related U.S. Application Data application No. 12/966,741, filed on Dec. 13, 2010, now Pat. No. 9,112,832.

(60) Provisional application No. 61/494,407, filed on Jun. 7, 2011.

(51) Int. Cl.
*H04W 12/08* (2009.01)
*H04W 4/21* (2018.01)

(52) U.S. Cl.
CPC ............... *H04W 4/08* (2013.01); *H04W 4/21* (2018.02); *H04W 12/08* (2013.01)

(58) Field of Classification Search
USPC .......................................................... 709/218
See application file for complete search history.

(56) References Cited

U.S. PATENT DOCUMENTS

| | | |
|---|---|---|
| 6,993,569 B1 | 1/2006 | Rees, Jr. |
| 7,039,708 B1 | 5/2006 | Knobi et al. |
| 7,334,126 B1 | 2/2008 | Gilmore et al. |
| 7,814,208 B2 | 10/2010 | Stephenson et al. |
| 8,024,227 B2 | 9/2011 | Howard et al. |
| 8,116,808 B2 | 2/2012 | Amine |
| 8,190,773 B2 | 5/2012 | Wikman et al. |
| 8,254,896 B2 | 8/2012 | Lazaridis |
| 2002/0116638 A1 | 8/2002 | Dobes et al. |
| 2002/0143855 A1* | 10/2002 | Traversat .............. G06F 9/4416 709/202 |
| 2003/0191970 A1 | 10/2003 | Devine et al. |
| 2004/0162883 A1* | 8/2004 | Oreizy .................. H04L 12/581 709/207 |
| 2004/0179537 A1 | 9/2004 | Boyd et al. |
| 2004/0199514 A1 | 10/2004 | Rosenblatt et al. |
| 2006/0031929 A1 | 2/2006 | Saito |
| 2006/0095502 A1* | 5/2006 | Lewis .................. H04L 12/581 709/203 |
| 2006/0101145 A1 | 5/2006 | Hoffman et al. |
| 2007/0022164 A1 | 1/2007 | Nog et al. |
| 2007/0203970 A1 | 8/2007 | Nguyen |
| 2008/0028078 A1 | 1/2008 | Saiki et al. |
| 2008/0065501 A1* | 3/2008 | Stuart .................... G06Q 30/00 705/26.1 |
| 2008/0148286 A1 | 6/2008 | Hetrick |
| 2008/0172449 A1 | 7/2008 | Bengtsson et al. |
| 2008/0208963 A1* | 8/2008 | Eyal ........................ G06Q 10/10 709/203 |
| 2009/0258634 A1 | 10/2009 | Amine |
| 2009/0300139 A1* | 12/2009 | Shoemaker ............ G06Q 10/10 709/217 |
| 2010/0088364 A1* | 4/2010 | Carter ................... H04L 63/105 709/203 |
| 2010/0131583 A1 | 5/2010 | Lee et al. |
| 2010/0293564 A1 | 11/2010 | Gould et al. |
| 2011/0035503 A1* | 2/2011 | Zaid ..................... H04L 63/0407 709/228 |
| 2011/0081923 A1 | 4/2011 | Forutanpour et al. |
| 2011/0119600 A1 | 5/2011 | Liu et al. |
| 2012/0079396 A1* | 3/2012 | Neer ...................... G06Q 10/107 715/745 |
| 2012/0131076 A1 | 5/2012 | Chen et al. |
| 2012/0136936 A1* | 5/2012 | Quintuna .............. G06F 21/604 709/204 |
| 2012/0144475 A1 | 6/2012 | Boire-Lavigne et al. |
| 2013/0138836 A1 | 5/2013 | Cohen et al. |

OTHER PUBLICATIONS

Wikman, Johan and Dosa, Ferenc, "Providing HTTP Access to Web Servers Running on Mobile Phones", Nokia Research Center Helsinki, http://research.nokia.com, NRC-TR-2006-005, May 24, 2006, 6 pp., XP-002435345.

Zimmerly, Bill; A Tiny Cloud in Android: Exploring the Android file system from your browser, Internet article, Nov. 17, 2009, pp. 1-12, XP002673823, http://www.ibm.com/developerworks/opensource/library/os-tinycloud/index.htm.

* cited by examiner

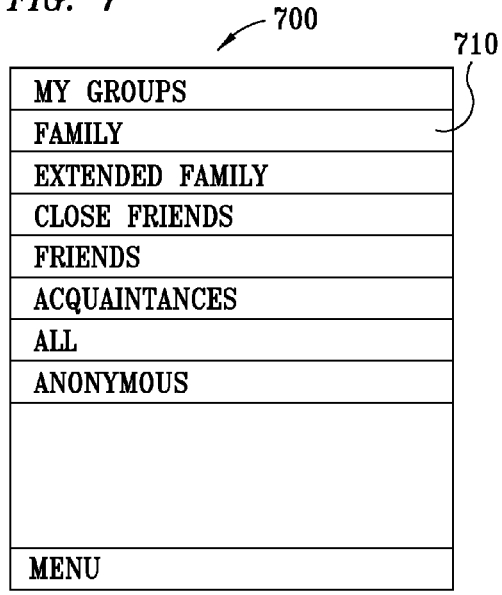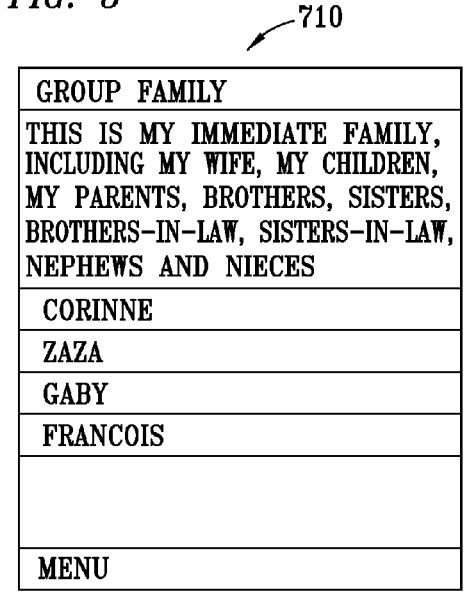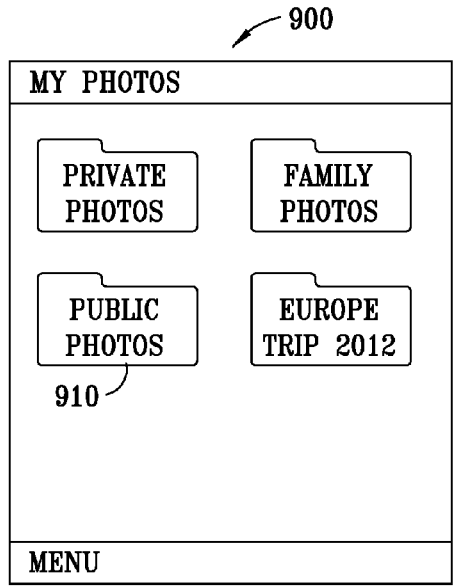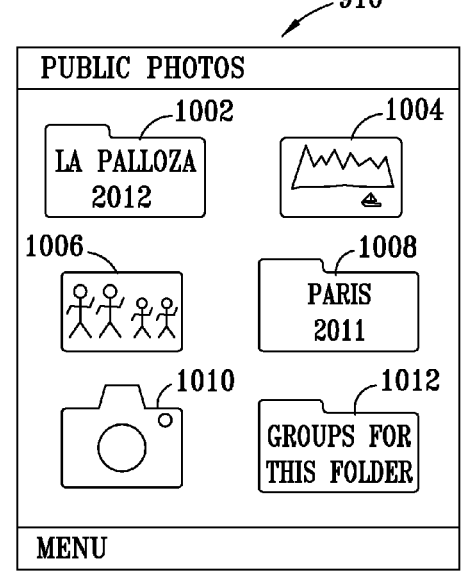

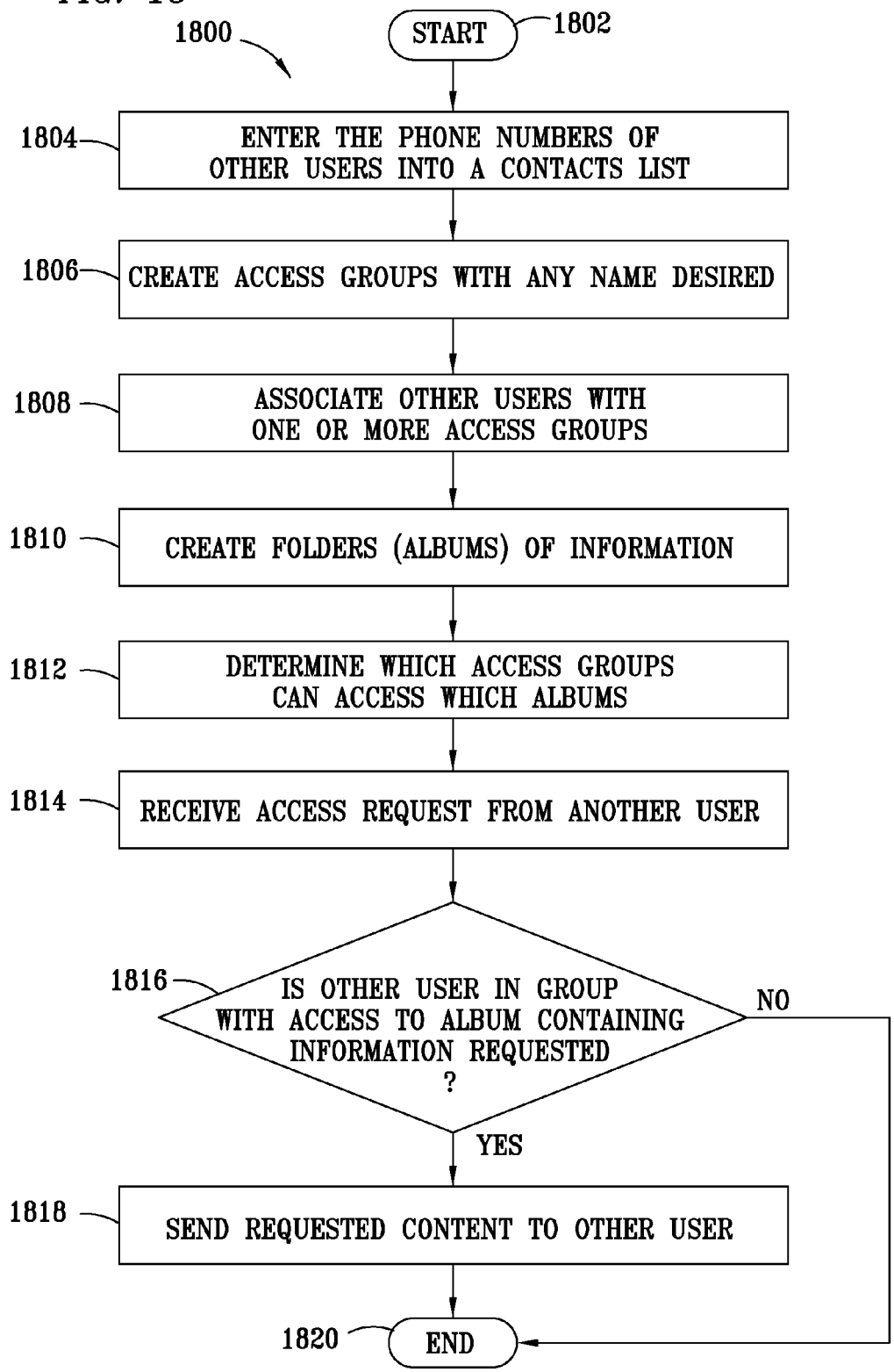

PEER-TO-PEER SOCIAL NETWORK

CROSS-REFERENCE TO RELATED APPLICATIONS

This application is a continuation-in-part of U.S. patent application Ser. No. 13/491,372, filed Jun. 7, 2012, which is a continuation-in-part of U.S. patent application Ser. No. 12/966,741, filed Dec. 13, 2010 (the '741 Application); application Ser. No. 13/491,372 claims the benefit of U.S. Provisional Application No. 61/494,407, filed Jun. 7, 2011, all of which applications are hereby incorporated herein by reference, in their entirety.

TECHNICAL FIELD

The invention relates generally to networks and, more particularly, to peer-to-peer social networks.

BACKGROUND

Social networks are essentially a centralized database of relationships where users share content. A given person has a record in this centralized database, and then other persons may be either invited to enter the network or may voluntarily enter the network, and then also have a record in that database. Once two or more persons are part of that "network" (in reality, a database in a web site), one person can then "invite" another person to be his/her friend. If the other person "accepts" that invitation, then those two persons are considered "friends" in that social network. Centralized social networks like those can then further break down the relationship of two persons as "family", "close friends", and the like. Again, the two persons must agree on those relationships, and those relationships are predefined according to the central database programming of that particular social network web site.

Once a user is a member of such a network, the user can post messages (sometimes called "blog entries"), pictures, videos, links to web-based content, and the like. The user can also create albums (of photos, video, or other content such as music) that can be accessible only to "family" and the like. Such accessibility is only to those subcategories of friendship that the social network has pre-defined can be used.

With the growing popularity of mobile Internet devices (e.g., "smartphones"), more and more users are accessing social networks via their mobile Internet devices. However, there are a number of problems associated with accessing a central social network database via a mobile Internet device. For example, users must find out if their friends are (or are not) on the network and then invite them. There are also a number of valid concerns that users may have using a social network. For example, once content is posted on the web, it can be copied by others and a user may lose control of it. A user may not be able to delete the content, which may be particularly problematical if a user posted content by mistake or regrets posting it. There is also a concern that content may be searched by web search engines. A user may be concerned that he/she cannot finely control who can access their content. For example, if a social network had three subcategories of relationships, for example, "Friends", "Close Friends", and "Family" and a user wanted to share something with only his/her spouse and/or children (or "Immediate Family"), that would not be possible on the social network. A central database could also be hacked and/or hijacked, or a central social network may decide to demand ownership of content published on it.

In view of the foregoing, what is needed is a system and/or method that can be employed to solve the aforementioned problems.

SUMMARY

The present invention, accordingly, teaches a peer-to-peer ("P2P") social network, which is preferably mobile-based via a mobile Internet device ("MID"), though it may be based on any Internet device, i.e., any computer capable of communicating through the Internet, all of which devices will be collectively referred to herein as an "MID". The P2P social network includes a relay server and an MID, wherein a web server and relay agent are integrated into the MID. The MID also includes an application ("app") embodying features of the present invention for running the web server and relay agent.

The MID preferably includes a list of contacts (i.e., other users) the user communicates with; therefore, a user does not need authorization from another person to add the other person to the user's contacts list. The user simply enters the second user's phone number into his contacts list. The present invention is enabled to use the SMS network to broadcast activity from users in the manner that a regular centralized social network does.

In accordance with principles of the present invention, a first user may freely create access groups with any name desired. For example, access groups may be created for "Acquaintances", "Friends", "Close Friends", "Family", "Extended Family", "Immediate Family", "Spouse", "Public", "Co-workers", "Clients", and the like. Once these access groups are created, the first user may go through his contacts list and determine for each person which group or groups they belong to.

The first user may also create folders (or subdirectories) that represent "albums". The first user may then go through his list of access groups and determine which access group(s) may access which albums.

A second user, who also has an application embodying features of the present invention installed on his MID, may go through his contacts list and attempt to identify albums the first user has created. Upon receiving from the second user a request for content from the first user, the first user's application then determines if the second user belongs to an access group that has access to the particular album holding the requested content. If the second user does have access, then the first user's application sends the requested content to the second user's MID. The application installed on the second user's MID can then display the content to the second user.

The invention preferably uses proprietary encryption keys to communicate on a P2P basis (via relay server software) between the MIDs. Further, when sending a request back and forth between MIDs having telephonic capability with a designated phone number, part of that request will include the MID's phone number, so that one user may "authenticate" another user's MID by way of his/her phone number.

As depicted by the foregoing, the first user never had to "invite" the second user to be his "friend", and the second user never had to "accept" that invite, thereby resolving the following shortcomings of the prior art:
 Users do not have to find out if their friends are in "the network"; their friends are already on the contacts list;
 Since all content can only be viewed via the app, the app will not allow for content to be saved or copied;

Since the content exists only in the user's MID, once deleted, it is deleted for good;

Since communication is encrypted with a proprietary encryption key, the content cannot be searched or viewed from the worldwide web; it can only be viewed from other users of the mobile application that have access to that content;

Users have as much control over who has access over the content as the user desires; and Since the content stays in the possession of the owner at all times, there is no question of copyright ownership.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 exemplifies a groups screen;

FIG. 8 exemplifies a family group screen;

FIG. 9 exemplifies a photos screen;

FIG. 10 exemplifies a public photos screen;

FIG. 18 is a flow chart exemplifying steps that may be performed in the operation of the present invention.

DETAILED DESCRIPTION

Figure 1:
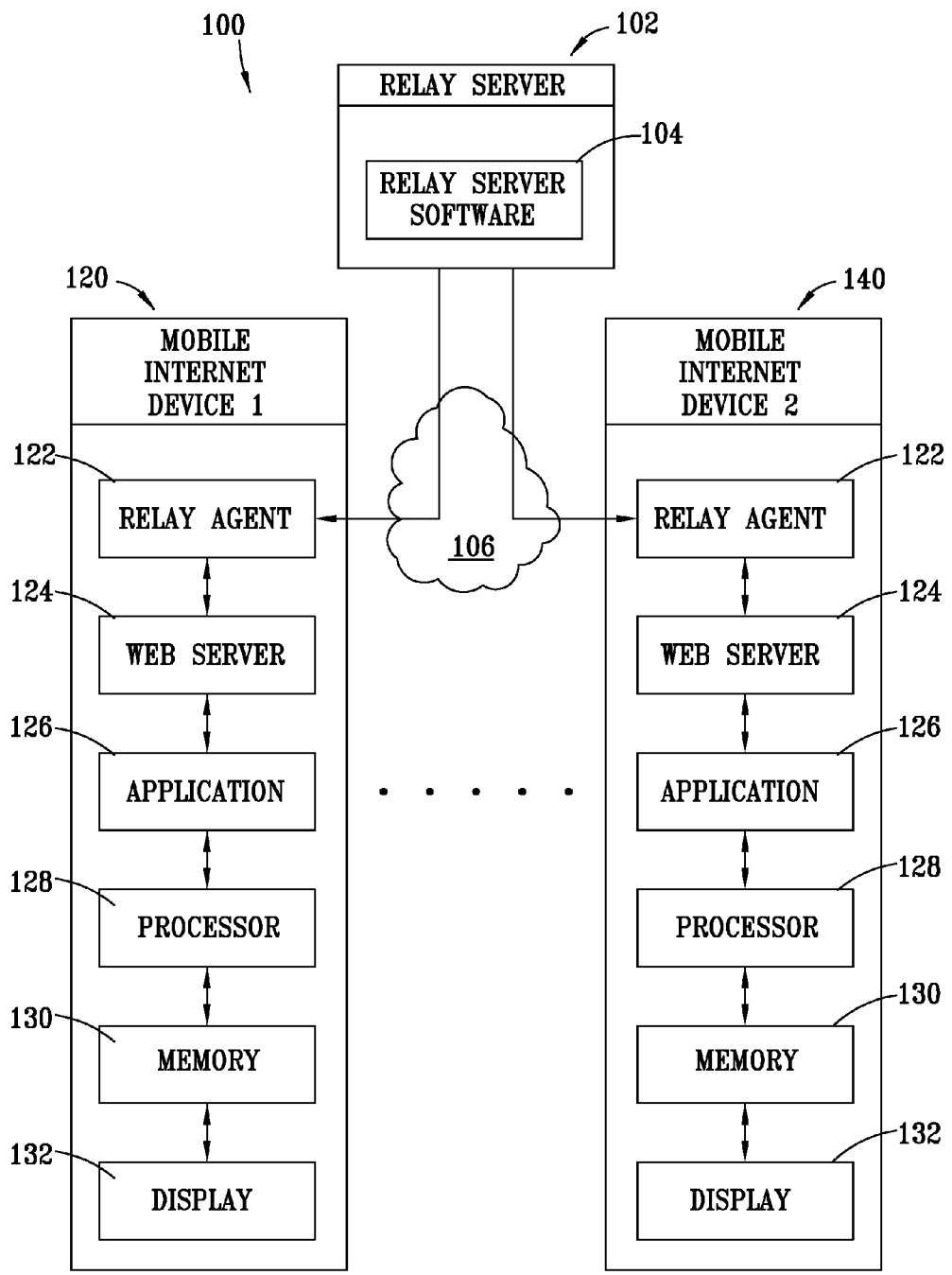
FIG. 1 is a schematic block diagram of a peer-to-peer ("P2P") network embodying features of the present invention.

Refer now to the drawings wherein depicted elements are, for the sake of clarity, not necessarily shown to scale and wherein like or similar elements are designated by the same reference numeral through the several views. In the interest of conciseness, well-known elements may be illustrated in schematic or block diagram form in order not to obscure the present invention in unnecessary detail, and details concerning various other components known to the art, such as Internet communications, web servers, and the like necessary for the operation of many Internet devices, have not been shown or discussed in detail inasmuch as such details are not considered necessary to obtain a complete understanding of the present invention, and are considered to be within the skills of persons of ordinary skill in the relevant art. Additionally, as used herein, the term "substantially" is to be construed as a term of approximation.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Inasmuch as the invention may be implemented on a smartphone, a desktop computer, a tablet, laptop computer, and the like, selections of options (e.g., icons) displayed may be made by way of clicking a mouse button, or touching or tapping a touch-sensitive screen. The term "selecting" will be used collectively herein to refer to any of clicking, touching, tapping, or the like.

Referring to FIG. 1 of the drawings, the reference numeral 100 generally designates a peer-to-peer ("P2P") social network embodying features of the present invention. The network 100 includes a relay server 102 coupled via a wireline or wireless communications link 106 (e.g., the Internet, a cellular radio network) to two or more Internet devices 120 and 140. The Internet devices 120 and 140 are preferably mobile-based and will be collectively referred to herein as mobile Internet devices ("MIDs"), though they may constitute any computing device with networking capability, such as, by way of example but not limitation, computers such as servers, desktop computers, laptop computers, tablets, smartphones, and the like. Each of the MIDs 120 and 140 includes a processor 128 operatively coupled to at least a memory 130, a relay agent 122 (defined by code stored in the memory 130), a web server 124 (defined by code stored in the memory 130), and a display 132. MID application software ("MAS") 126, also referred to as an app" or a "computer program" is stored in the memory 130. The MAS 126 includes computer program code which, when executed by the processor 128, is effective for running the web server 124 and relay agent 122 via a number of different display screens for supporting social network functions between multiple MIDs 120/140 in accordance with principles of the present invention. As discussed in further detail below, FIG. 2 exemplifies a number of such display screens and how they are related between the screens. As used herein, the term "software" is understood to include firmware.

The relay server 102 includes relay server software 104 coupled via the wireline or wireless communications link 106 which acts as a "tunnel" to the relay agent 122, web server 124, and MID application software 126. The web server 124 is preferably operable on any of a number of different protocols, such as, by way of example, but not limitation, Hypertext Transfer Protocol (HTTP), Hypertext Transfer Protocol Secure (HTTPS), File Transfer Protocol (FTP), Secure File Transfer Protocol (SFTP), Network News Transfer Protocol (NNTP), Simple Mail Transfer Protocol (SMTP), Internet Message Access Protocol (IMAP), Internet Control Message Protocol (ICMP), Secure Shell (SSH)

protocol, Notifications Protocol, Telnet, Gopher, and/or Read and Write (RAW) protocol communications or proprietary protocols.

Figure 2:
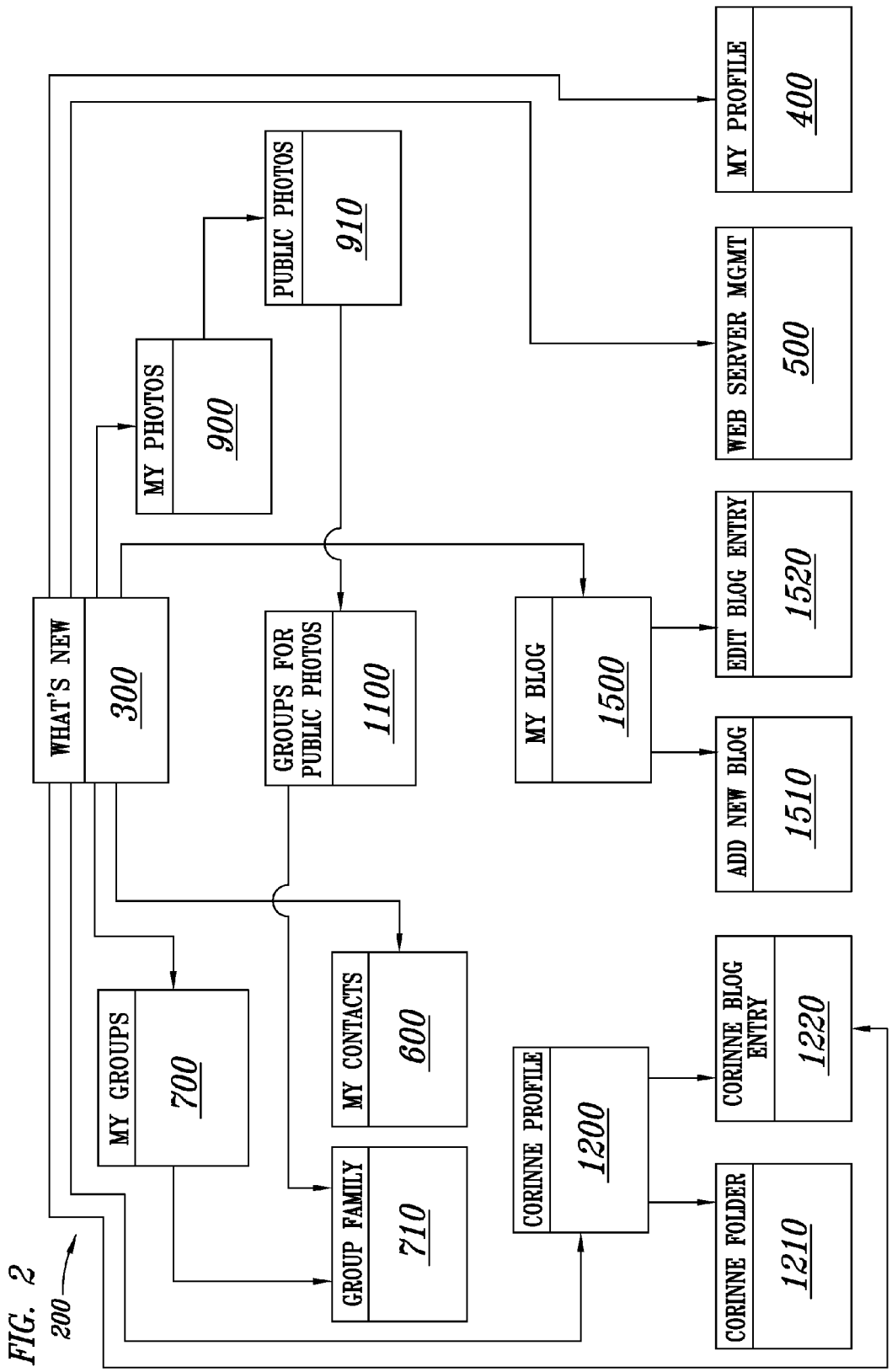
FIG. 2 exemplifies the relationships between various functions by way of display screens of a device embodying features of the present invention.

Referring to FIG. 2, the reference numeral 200 generally designates a map exemplifying relationships that may be established between various functions of the invention by way of display screens.

Figure 3:
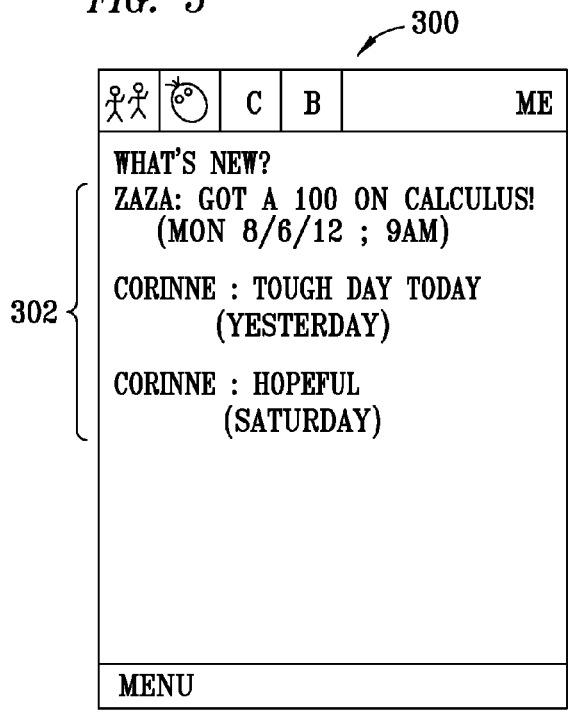
FIG. 3 exemplifies an initial screen.
Figure 4:
FIG. 4 exemplifies a profile screen.
Figure 5:
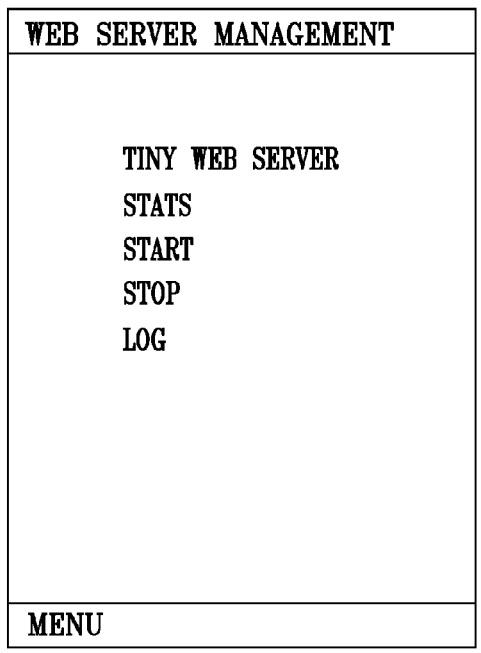
FIG. 5 exemplifies a web server management screen.

Screen 300 (FIGS. 2 and 3) is the main screen of the MAS 126 and is preferably the initial screen that a user sees. The Screen 300 preferably includes a number of tabs or icons which act as shortcuts to other screens. For example, as shown and discussed in further detail below, the left-most icon is a shortcut to Screen 700 (the Groups Screen); the second icon is a shortcut to Screen 900 (My Photos); the third icon is a shortcut to Screen 600 (My Contacts); the fourth icon is a shortcut to Screen 1500 (My Blog), and the right-most icon is a shortcut to Screen 400 (My Profile). A menu item is provided through which a user may go to Screen 500 (My Server, FIGS. 2 and 5) which provides information and functions that enable a user to manage the web server 124.

Screen 300 preferably enables a user to see activity from all his/her contacts. The MAS "listens" and intercepts all SMS messages that have an MAS 126 header and decrypts them, and then deletes them from the SMS system, so as not to confuse the user. The MAS preferably transports media and broadcasts (e.g., to friends) updates (e.g., to social network) using protocols, such as SMS, notification broadcast, and the like. Screen 300 preferably displays blog entries 302 for all of a user's contacts, similar to the lower portion 1202 of Screen 1200 (showing blog entries 1202, discussed in further detail below with respect to FIG. 12). Once a user selects a given icon or blog entry 302 on the Screen 300 or blog entry 1202 on the Screen 1200, the app takes the user to a screen, such as Screen 1220 which shows the entire blog entry. If the user selects a contact name (rather than the contact's message), the app will go to Screen 1200 for that contact.

Every screen, other than main Screen 300, preferably includes a "home" tab that may be selected to return the MAS to Screen 300. If a widget (e.g., a continually running app in the Android operating system) is defined, it should show the most recent blog post, and if the user selects it, it should take him to Screen 300.

The My Profile Screen 400 enables the user to review and change his profile, which may contain, by way of example but not limitation, the user's profile picture, date of birth (i.e., birthday), zip code, education, and the like.

The My Server ("Web Server Management") Screen 500 enables a user to manage the web server 124, such as the "tiny" web server disclosed in the '741 Application.

Figure 6:
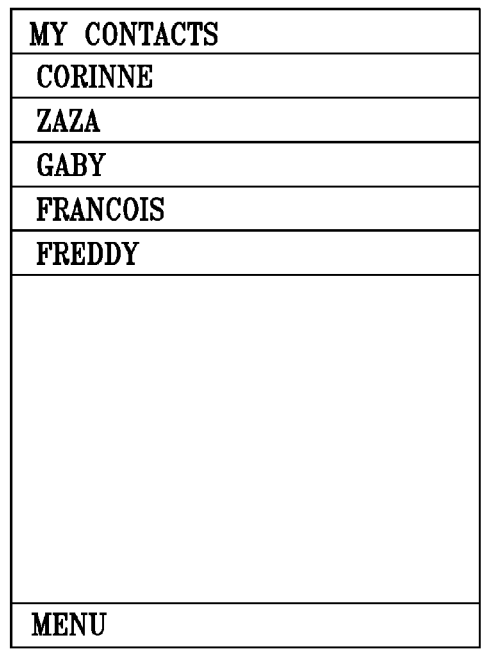
FIG. 6 exemplifies a contacts screen.
Figure 16:
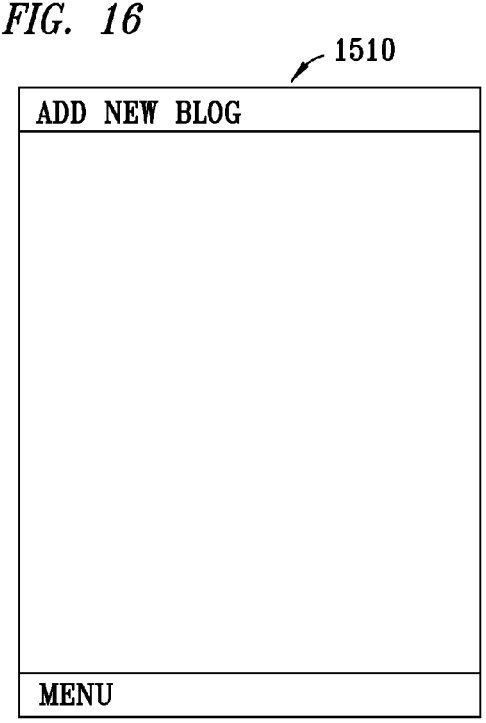
FIG. 16 exemplifies a screen for adding a new blog.
Figure 17:
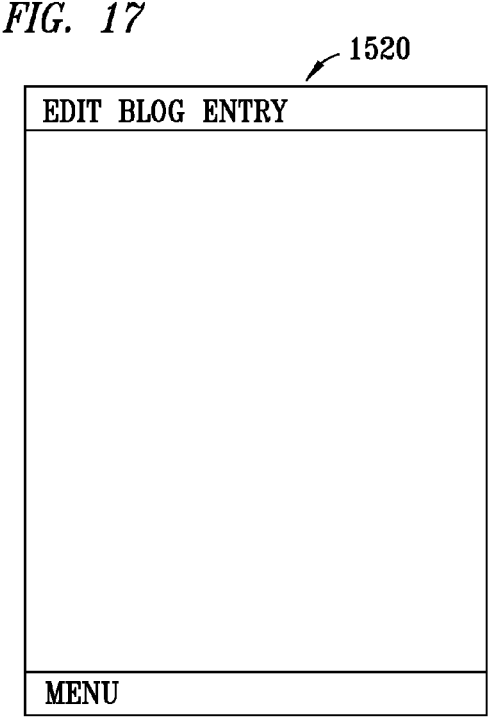
FIG. 17 exemplifies a screen for editing a blog screen.

The remaining screens of FIG. 2 (i.e., 600-1520) display various data and information stored in the memory 130 of the MIDs that conventionally have been stored on large central database servers for social networks operated by third parties on the Internet. As discussed in further detail below, such information includes, by way of example but not limitation, contacts lists (including names and phone numbers) 600 (FIGS. 2 and 6), access groups 700 and 710 (FIGS. 2, 7, and 8), folders 900 and 910 (FIGS. 2, 9, and 10) for storing data and information that others may find interesting, profiles of others 1200, 1210, and 1220 (FIGS. 2 and 12-14), and blogs 1500 (FIGS. 2 and 15), as well as functionality for adding and editing blogs 1510 and 1520 (FIGS. 2, 16-17).

The My Contacts Screen 600 (FIGS. 2 and 6) is the main screen where the user enters and reviews his/her contacts that are part of the MAS system. Contact information preferably includes, by way of example but not limitation, various information on other users, such as their name, phone number(s) (e.g., cell, home, business), email addresses, residence addresses, picture, and the like. While not shown, Screen 600 preferably includes icons to signify with what type of group that contact is associated.

In a preferred embodiment, the MAS would allow a user to select a contact name and then take him/her to Screen 1200. If the user leaves his finger on a given contact for a predetermined amount of time, such as a few seconds, a pop-up is preferably displayed that gives him/her the following options: (1) go to the contacts screen for that contact (Screen 1200), (2) delete that contact from the MAS system, in which case the user will be prompted to confirm the deletion, or (3) add the current contact to a given group, in which case a further pop-up dialog will be displayed giving the user that option. Screen 600 preferably also includes a menu item that will enable the user to add a new contact from the phone's contacts list into the contacts list for the MAS system.

The My Groups Screen 700 is a top-level screen that shows a list of all of the access groups the user has. The MAS is preferably created, by default, with only four groups: Family, Friends, Acquaintances and "All". The "All" Group is special and it means that anybody in the user's contact list can access a given folder. A menu is preferably provided on Screen 700 for enabling the user to add new groups, such as "Close Friends", "Extended Family", "Immediate Family", "Spouse", "Public", "Co-workers", "Clients", and the like.

There is preferably also another group named "Anonymous" which anybody can access, even if not in the user's contact list. Any content that is deemed to be anonymous (i.e., accessible to the group called "Anonymous") may optionally be made accessible from the web, to search engines, and the like. Such a group would only be used for true, public content.

If the user leaves his finger on a particular group displayed on the My Groups Screen 700 for more than a predetermined amount of time, such as a few seconds, a pop-up menu will be displayed providing the user with the option to either go to the indicated group via a Screen 710 (discussed below) or delete that group (in which case the user will be asked to confirm the choice). If the user selects a group, the user is taken to Screen 710, discussed further below.

The Group Family Screen 710 (FIGS. 2 and 8) preferably identifies the defining characteristics of each access group and contacts associated with the group. Once the access groups are created, a user may go through his contacts list and determine which person belongs to which group or groups. A menu item enables the user to add new persons to a selected group.

Screen 710 not only displays a selected group, but it also enables a user to edit a selected group, including the contacts in the group. If a user leaves his finger on the description of the group for a second or two, a pop-up is preferably displayed that allows the user to edit the name of the current group and/or its description and defining characteristics. If a user leaves his finger on a given contact name for a second or two, a pop-up menu is preferably displayed which shows options such as the following: (1) go to that particular contact's screen (Screen 1200) or (2) remove that contact from the current group, with user confirmation. If the user selects a contact, the user is taken to Screen 1200.

Folders (i.e., subdirectories), such as exemplified by the reference numeral 910 in FIGS. 2 and 10, may also be created to represent "albums" of information (e.g., photos) that may be of interest to other users. A list exemplified by the reference numeral 900 provides a list of the albums created.

The My Photos Screen 900 exemplifies how a user manages his photos. It is the top-level screen and looks like a "windows explorer" type of screen. It preferably enables a user to go to other folders when he selects them (Screen 900). If the user leaves his finger there, a pop-up menu appears whereby the user has the chance to go to that folder, rename the folder, or delete it. If the user chooses to rename the folder, a dialog will preferably be presented to ask for a new name. If the user chooses to delete the folder, a dialog for confirmation will be presented. Screen 900 preferably also includes a menu item that allows for the creation of new folders.

The Public Photos Screen 910 corresponds to a specific folder that would be listed in the My Photos Screen 900. As exemplified in FIG. 10, it is named "Public Photos". This Screen will preferably display small images of pictures, such as 1004 and 1006, saved in the folder. If there are sub-folders, such as 1002 or 1008, it will render a folder icon so the user can select to go to it or, if the user holds the selection, it will behave similarly to Screen 900. The user may make a selection to go to the sub-folder (or picture). If the user selects a picture, the picture is preferably displayed in the highest resolution possible for the device.

The Public Photos Screen 910 also has two additional buttons (or icons). One icon is the icon 1010 of a camera; when a user selects that icon, he is taken to a camera application. Once the user selects it, it places the picture on the current folder and re-renders the current screen so the new picture is shown. There is also a button 1012 that, when selected, will take the user to Screen 1100, discussed in further detail below, where he decides which groups can access this folder.

If the user leaves his finger on top of a picture in Screen 910, the MAS system will give him the option to (1) delete (with confirmation) the photo, or (2) allow him to drag the picture to a folder. Also, if the screen represents a sub-folder, the first icon on the screen should be a folder symbolizing the parent folder so the user can move pictures to the parent folder, if desired.

The Public Photos Screen 910 also has a menu item to allow for the creation of new sub-folders. Sub-folders inherit all the security attributes of the parent folder.

Optionally, a photo-effect mini-app can be included with Screen 910 to edit pictures.

Figure 11:
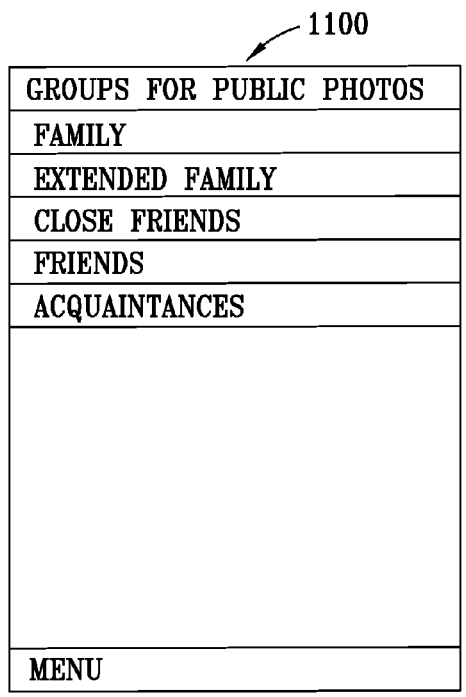
FIG. 11 exemplifies a group for public photos screen.

FIGS. 2 and 11 depict a list 1100 which associates access groups with albums, such as Public Photos, as exemplified in FIG. 2. That is, the list 1100 indicates which groups of contacts can view what albums. The Screen 1100 enables a user to add or delete groups that (in this example) can access the folder named "Public Photos". If a group named "All" (which is a special group) is in the list, it basically means anybody can view that folder, making it a moot point to have other groups. There can be another group called "Anonymous". Groups and their features are discussed in further detail above with respect to Screen 700.

If the user leaves a finger on a given group, a pop-up menu appears giving him the ability to remove the group's access to the current folder or go to that group's screen (i.e., Screen 710). If the user selects a group, the user is directed to the Group Family Screen 710. A menu item exists to add a new group to have access to the current folder.

Figure 12:
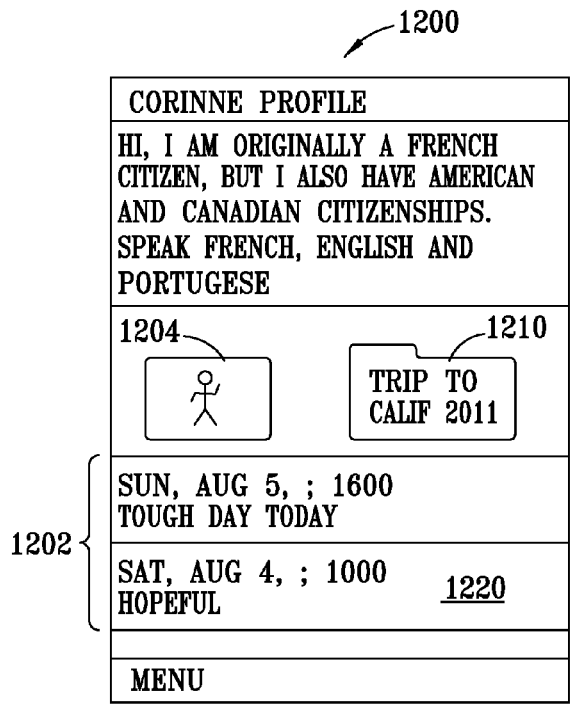
FIG. 12 exemplifies a profile screen for a particular person.

FIGS. 2 and 12 exemplify how one user (e.g., MID 120) may view and save the profiles of other users (e.g., MID 140), as well as maintain information on the other user in a folder 1210 and a blog 1220 set up by the other user.

With Screen 1200, the user is enabled to see pictures (e.g., the picture 1204) shared by someone else on his/her contacts. A brief amount of information about that person is displayed with such a thing as a profile picture, presentation (or perhaps a button that takes the user to another screen, since screen space is limited), and the folders that were shared by that person will appear and be rendered. The behavior from that point on will be similar to Screen 910, but of course without the ability to delete or create folders, etc. Only the ability to view and navigate is available. This screen will preferably send an HTTP request to a web page to request top-level shared folders and a list of blog-entries.

Figure 13:
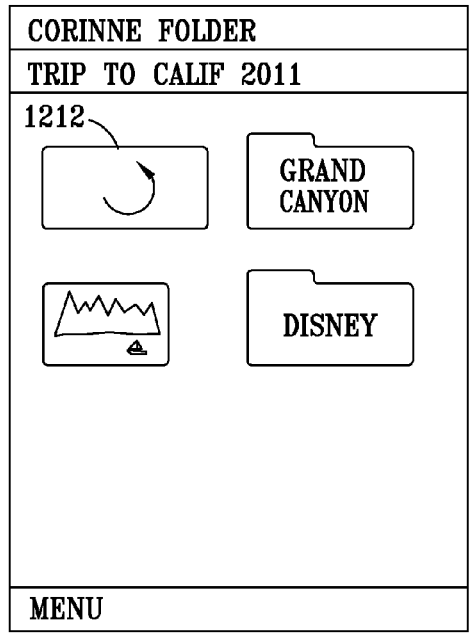
FIG. 13 exemplifies a folder for the person of FIG. 12.

If the user is on Screen 1200 and selects a folder 1210, the user will be taken to Screen 1210 (FIG. 13).

Figure 14:
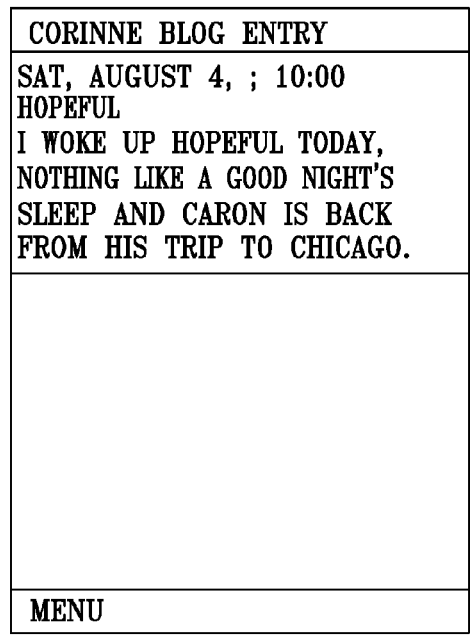
FIG. 14 exemplifies a blog entry for the person of FIG. 12.

To the lower portion 1202 of Screen 1200, blog posts shared by that person are displayed. Preferably only the subject line (e.g., the first line) of the post will appear. If the user selects that line, it will take him to a screen such as Screen 1220 (FIG. 14). The list will preferably be shown in reverse chronological order (latest blog entry first).

There is preferably a menu item on this Screen 1200 that allows the user to add that person to a group, delete that person from a group, delete that person from the MAS contacts, or even to send a private message to that person, which will be sent only to that person. An SMS message will preferably be sent, having a special header that signifies that the SMS was sent via the MAS system. A proprietary encryption key may optionally be used, so that SMS may not be easily deciphered.

Screen 1210 (FIG. 13) is very similar to Screen 910 (FIG. 10) in appearance, though Screen 1210 preferably also includes a Refresh button 1212 but has no ability to delete or create folders, rename, take photos onto that folder, etc. Preferably only the ability to view and navigate is available with Screen 1210. Screen 1210 will send an HTTP request to a web page to request the contents of the current shared folder. Screen 1210 will then render all pictures as small icons, and render sub-folders as little folders icons.

If, in Screen 1210, the user selects a picture, it will preferably render the picture in the best possible resolution. If the user selects a folder, the user is taken to that sub-folder.

Screen 1220 (FIG. 14) will display a given blog entry for a particular contact person. This activity will send an HTTP request to a web page to request a specific blog entry. A menu item will preferably allow the user to add a comment to this blog entry, via a pop-up dialog. A comment will be made and, upon completion, another pop-up will appear to ask which groups can see that post and also if this comment should be broadcasted. That comment will be considered a blog post by the user, and will be saved on the user's MAS memory 130 so others can view it, and the app will prompt to which groups this blog should be posted. If the user decides that the comment should also be broadcasted, the app will send it via SMS (encrypted and with an MAS header).

Figure 15:
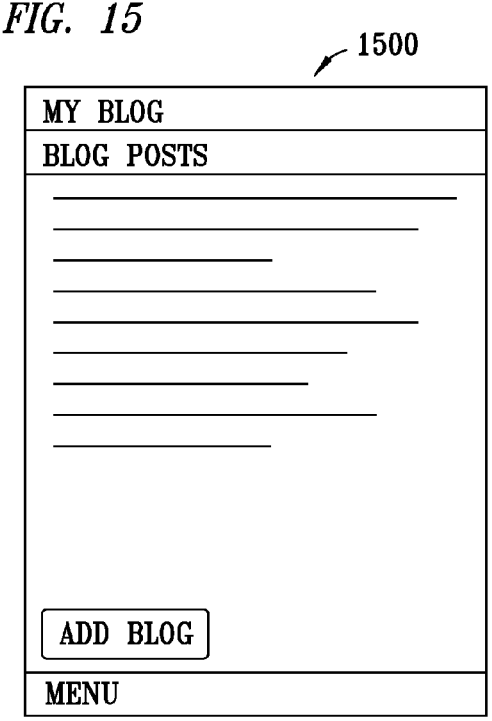
FIG. 15 exemplifies a blog screen.

Still further, a user may set up his/her own blog Screen 1500 (FIGS. 2 and 15). A user may also edit the blog 1500 via Screen 1510, and edit entries in the blog via Screen 1520.

Screen 1500 (FIGS. 2 and 15) is where the user sees his blog entries. A blog entry preferably includes a date/time stamp, a first line (which is to be used as a subject line), and as many lines the user decides to have. In this particular Screen, each line represents the date/time stamp of his last blog plus the subject line (in reverse chronological order, the latest blog being the first). If the user selects a particular blog entry, it takes him to Screen 1520 to edit his blog entry. If he leaves a finger on the blog entry, a pop-up menu with the following options occurs: (1) to edit the blog (Screen 1520) or (2) to delete the blog entry, with confirmation from the user.

There is preferably a button at the end of the blog entries to add a new blog entry (Screen 1510).

Screen 1510 (FIGS. 2 and 16) allows a user to add a post. It is basically a screen that freely allows the user to type his blog. Once the user is satisfied with his blog, he may select a button to signify that he is done. A pop-up screen will appear to allow the user to select (1) which groups should see his blog entry, (2) if he wants the blog entry to be broadcasted immediately (via SMS, with an MAS header and encrypted, or (3) if he wants to cancel his blog entry.

Screen 1520 (FIGS. 2 and 17) is similar to Screen 1510, but is pre-filled with an existent blog post.

FIG. 18 depicts a flow chart 1800 which exemplifies steps for performing the operation of the present invention. Beginning at 1802, a user 120 proceeds to step 1804 wherein he/she enters the phone number of one or more other users 140 into a contacts list of the user 120. At step 1806, the user 120 creates access groups using any criteria desired and assigning suitable names to the groups. At step 1808, the user 120 associates selected users 140 with one or more of the access groups. At step 1810, the user 120 creates albums (e.g., 910) of information. At step 1812, the user 120 creates associations to specify which access groups of contacts can access which albums.

In step 1814, the user 120 receives from a user 140 a request for access to albums (e.g., 910) of the user 120. In step 1816, a determination is made whether the user 140 is in an access group that has access to the information requested by the user 140. If it is determined at step 1816 that the user 140 has access to the information requested, then in step 1818, the requested information is sent to the user 140. The information is preferably sent using encryption keys that only the users 120 and 140 have so a data crawler in the Internet cannot retrieve the information and it is thereby kept private.

It is understood that the present invention may take many forms and embodiments. Accordingly, several variations may be made in the foregoing without departing from the spirit or the scope of the invention. For example, different P2P technologies may be used, such as Skype, instant messaging systems, online chat networks, and the like. Further, the invention may be used not only for social networks, but also for sharing content. Still further, a user may associate contacts individually (i.e., without using access groups) with information, such as albums or individual pieces of information (e.g., individual photos). The relay agents 122 of the devices 120 and 140 may be coupled via a network other than the Internet, such as a cellular network, or a combination thereof.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A peer-to-peer network comprising:
   a relay server;
   two or more mobile Internet devices (MIDs) coupled to the relay server, each of the two or more MIDs including:
   a processor;
   a memory coupled to the processor;
   an operating system (OS) and a user interface framework (UIF) coupled to the OS, each of the at least two MIDs being operable at an OS level and at a UIF level, the OS level being distinct from the UIF level;
   a relay agent operatively coupled to the processor and operatively coupled via a tunnel to the relay server for interfacing the two or more MIDs to the relay server;
   a web server operatively coupled to the processor and operatively coupled via the relay agent to the relay server, the web server having a first portion and a second portion, the first portion residing within and being operable on the OS at the OS level of a respective one of the at least two MIDs for servicing HTTP requests, the second portion residing within and being operable on the UIF at the UIF level of a respective one of the at least two IDs MIDs; and
   at least one application operably coupled to the relay agent for effectuating communication with the web server.

2. The peer-to-peer network of claim 1 wherein the memory includes:
   a list of contacts, each contact including the name of a user, one of the two or more MIDs respectively associated with the user, and the address of the respective one of the two or more Internet devices MIDs;
   one or more access groups, each of the one or more access groups identifying selected contacts from the list of contacts to have access associated with the respective access group;
   one or more albums, each album containing selected information; and
   one or more associations between the one or more access groups and the one or more albums to specify which of the one or more access groups of contacts can view which of the one or more albums.

3. The peer-to-peer network of claim 1 wherein the peer-to-peer network is a peer-to-peer social network.

4. The peer-to-peer network of claim 1 wherein the peer-to-peer network is a peer-to-peer content-sharing network.

5. The peer-to-peer network of claim 1 further comprising an encryption module for encrypting information sent from one contact to another user.

6. The peer-to-peer network of claim 1 wherein two or more MIDs are two or more smartphones.

7. The peer-to-peer network of claim 1 wherein the peer-to-peer network is an Internet network.

8. The peer-to-peer network of claim 1 wherein the peer-to-peer network is a cellular network.

9. A method for operating a network using a device at least two mobile Internet devices (MIDs), each of the at least two MIDs having a processor coupled to a memory, the processor being further coupled via a web server to a relay agent, the relay agent being connected via a tunnel to a relay server, each of the at least two MIDs having an operating system (OS) and a user interface framework (UIF), each of the at least two MIDs being operable at an OS level and at a UIF level, the OS level being distinct from the UIF level, the memory including computer program code which, when the code is loaded into the memory and run by the processor, causes the processor to perform steps of:

operating at least a first portion of the at least one web server within the OS at the OS level of each of the at least two MIDs for servicing HTTP requests, and operating at least a second portion of the at least one web server within the UIF at the UIF level of each of the at least two MIDs;

entering and saving phone numbers of users in the memory;

creating access groups and saving the access groups in the memory;

associating each of one or more users with one or more access groups;

creating albums of information and saving the albums in the memory;

determining which access groups can access which albums;

receiving an information request from a requesting user;

determining if the requesting user is associated with an access group that has access to the requested information; and when it is determined that the requesting user is associated with an access group that has access to the requested information, sending the information via the web server and relay agent via the tunnel to the relay server with instructions for delivering the information to the requesting user.

10. The method of claim 9 wherein the information sent via the web server and relay agent to the relay server includes instructions for delivering the information to the requesting user in an encrypted format.

11. The method of claim 9 wherein the network is a peer-to-peer social network.

12. The method of claim 9 wherein the network is a peer-to-peer content-sharing network.

13. The method of claim 9 further comprising an encryption module for encrypting information sent from one contact to another user.

14. The method of claim 9 wherein two or more MIDs are two or more smartphones.

15. The method of claim 9 wherein the network is an Internet network.

16. The method of claim 9 wherein the network is a cellular network.

* * * * *